United States Patent [19] [11] 4,132,468
Lo et al. [45] Jan. 2, 1979

[54] PROJECTION APPARATUS FOR STEREOSCOPIC PICTURES

[75] Inventors: Allen K. W. Lo; Jerry C. Nims, both of Dunwoody, Ga.

[73] Assignee: Dimensional Development Corp., Atlanta, Ga.

[21] Appl. No.: 858,549

[22] Filed: Dec. 8, 1977

Related U.S. Application Data

[62] Division of Ser. No. 698,064, Jun. 21, 1976.

[51] Int. Cl.² .............................................. G03B 21/00
[52] U.S. Cl. ...................................... 353/7; 350/132; 354/115; 355/22
[58] Field of Search ....................... 353/7, 8, 9, 10, 30, 353/31, 32, 33, 34, 38; 355/22; 354/115, 112, 114; 350/132; 352/57

[56] References Cited

U.S. PATENT DOCUMENTS

| | | | |
|---|---|---|---|
| 1,935,471 | 11/1933 | Kanolt | 354/112 |
| 3,014,403 | 12/1961 | Alofs | 353/38 |
| 3,291,555 | 12/1966 | Browning | 354/115 |
| 3,995,288 | 11/1976 | Yevick | 353/38 |

Primary Examiner—Richard E. Aegerter
Assistant Examiner—John W. Shepperd
Attorney, Agent, or Firm—Brumbaugh, Graves, Donohue & Raymond

[57] ABSTRACT

In the illustrative embodiments of the invention disclosed, autostereoscopic pictures are produced by projecting a series of two-dimensional views of an object field onto a lenticular screen. Substantially uninterrupted and non-overlapping condensed, or lineiform, images of the two-dimensional views are formed beneath each lenticule of the lenticular screen by setting the number M of these images in the image band beneath each lenticule, and hence the total number of two-dimensional views projected, equal to w/m, where w is the lenticule width and m is the width of each condensed image. In order to project the required number M of two-dimensional views while avoiding gaps between adjacent condensed images, the projection lenses and the associated film frames are positioned along a plurality of adjacent, parallel, straight lines in a manner such that the apertures of the lenses are effectively in edge-to-edge contiguous relation.

1 Claim, 16 Drawing Figures

PROJECTION APPARATUS FOR STEREOSCOPIC PICTURES

This is a division, of application Ser. No. 698,064 filed June 21, 1976.

BACKGROUND OF THE INVENTION

1. Field of the Invention

The present invention relates in general to the production of autostereoscopic pictures of the type employing a lenticular screen. More specifically, the invention concerns novel apparatus for composing or projecting such pictures in such a way that uninterrupted and non-overlapping condensed, lineiform images are formed beneath each lenticule of the lenticular screen.

2. The Prior Art

Lenticular screen-type autostereoscopic pictures are produced basically according to two techniques: the direct or "in camera" technique, in which the taking and composing steps are both carried out within the camera, and the indirect technique, in which a number of two-dimensional views of an object field are made from different vantage points and the three-dimensional picture is subsequently composed or projected by projecting the two-dimensional images through a lenticular screen. The present invention has its principal applicability to the indirect technique, so that only this technique will be described hereinafter.

Various advances in the state of the art of the indirect technique are disclosed by Lo and Nims in the commonly owned U.S. Pat. No. 3,953,869. One of these advances and improvements concerns apparatus for expanding the individual, projected, condensed lineiform images so that these images will be contiguous (but do not overlap). This is accomplished by "scanning" the projected image from each two-dimensional frame in a direction transverse to the longitudinal direction of the lenticules. Such apparatus causes the condensed lineiform images to fill the image band beneath each lenticule while permitting the projection of less than w/m images, where w is the lenticule width of the lenticular screen and m is the width of the condensed images.

Although the aforementioned scanning technique affords important advantages for certain applications, it is desirable in some instances to be able to compose stereoscopic pictures without use of the scanning mechanisms associated with that technique. This is particularly true where very short composing times are necessary as, for example, in the manufacture of mass production items such as postcards and the like.

SUMMARY OF THE INVENTION

It is an object of the present invention to provide apparatus for composing or projecting stereoscopic pictures of the type employing a lenticular screen, which permits a sufficient number M of two-dimensional views to be projected such that the image band beneath each lenticule is filled with condensed images without substantial overlap of or gaps between adjacent images.

It is a further object of the present invention to provide apparatus of the foregoing type which exhibits the optimum optical geometry for projection of images.

Still another object of the invention is to provide apparatus of the foregoing type which is capable of one-step substantially "instantaneous" composing of stereoscopic pictures.

These objects, as well as other objects which will become apparent in the discussion that follows, are achieved, according to the present invention, by arranging the projecting lenses in the apparatus along a plurality of spaced-apart rows which extend in a plane parallel to the lenticular screen and generally perpendicular to the longitudinal direction of the individual lenticules. In this way, the lens locations extend not only to the direction of an X axis which is transverse to the longitudinal direction of the lenticules, but also in the direction of a Y axis, transverse to the X axis. In a preferred embodiment of the invention, the rows containing the lenses are adjacent, parallel, straight lines, with the rows offset relative to one another in the X direction such that the apertures of the lenses, when viewed in the direction of the Y axis, are in substantial edge-to-edge contiguous relation.

According to the invention, the number M of two-dimensional views which are projected by the apparatus may be the same as the number N of different two-dimensional views which are taken in the photographic stage of the indirect process; however, this is not necessary. According to a particular preferred embodiment of the invention, each different two-dimensional view taken may be duplicated two, three or more times and each duplicated negative arranged for projection in a different row.

It has been found to be advantageous to space the different rows of lenses as closely together as is practical, depending on the outside diameter of the lenses and the width of the two-dimensional views. In projection apparatus of this type, it is preferable that all of the lenses have the same aperture size so that the image quality attributable to each lens will be the same. It may be desirable in certain situations, however, as, for example, in order to exactly match the projecting angle of the lenses to the acceptance angle of the lenticular screen, to vary the aperture size of one or more of the endmost lenses. With the spacing as just described, separation of lenses in the Y axis direction may be kept to a minimum, thus permitting use of only the central portion of each lens for projection purposes and thereby minimizing distortion.

When used as a composer, the apparatus according to the present invention may project images onto a lenticular screen having a suitable photographic emulsion disposed on the reverse side thereof. If desired, such a lenticular screen may be automatically sequenced into position beneath the projection lenses to increase the speed and reduce the cost of the composing process. Apparatus for moving successive lengths of a flexible band of lenticular screen material into position may comprise a supply and take-up spool for the material and a motor drive which rotates the take-up spool a prescribed amount after each stereoscopic picture has been composed.

The apparatus according to the present invention may also be employed as a projector. In this case the lenticular screen may constitute a laminate comprising, in successive order:

(1) a layer of transparent material forming a first series of parallel lenticules;
(2) a light diffusing layer; and
(3) a layer of transparent material forming a second series of parallel lenticules. The lenticules of the first and the second series should have similar dimensions, face in opposite directions and be arranged in substantial registry.

DESCRIPTION OF THE PREFERRED EMBODIMENTS

Figure 1:
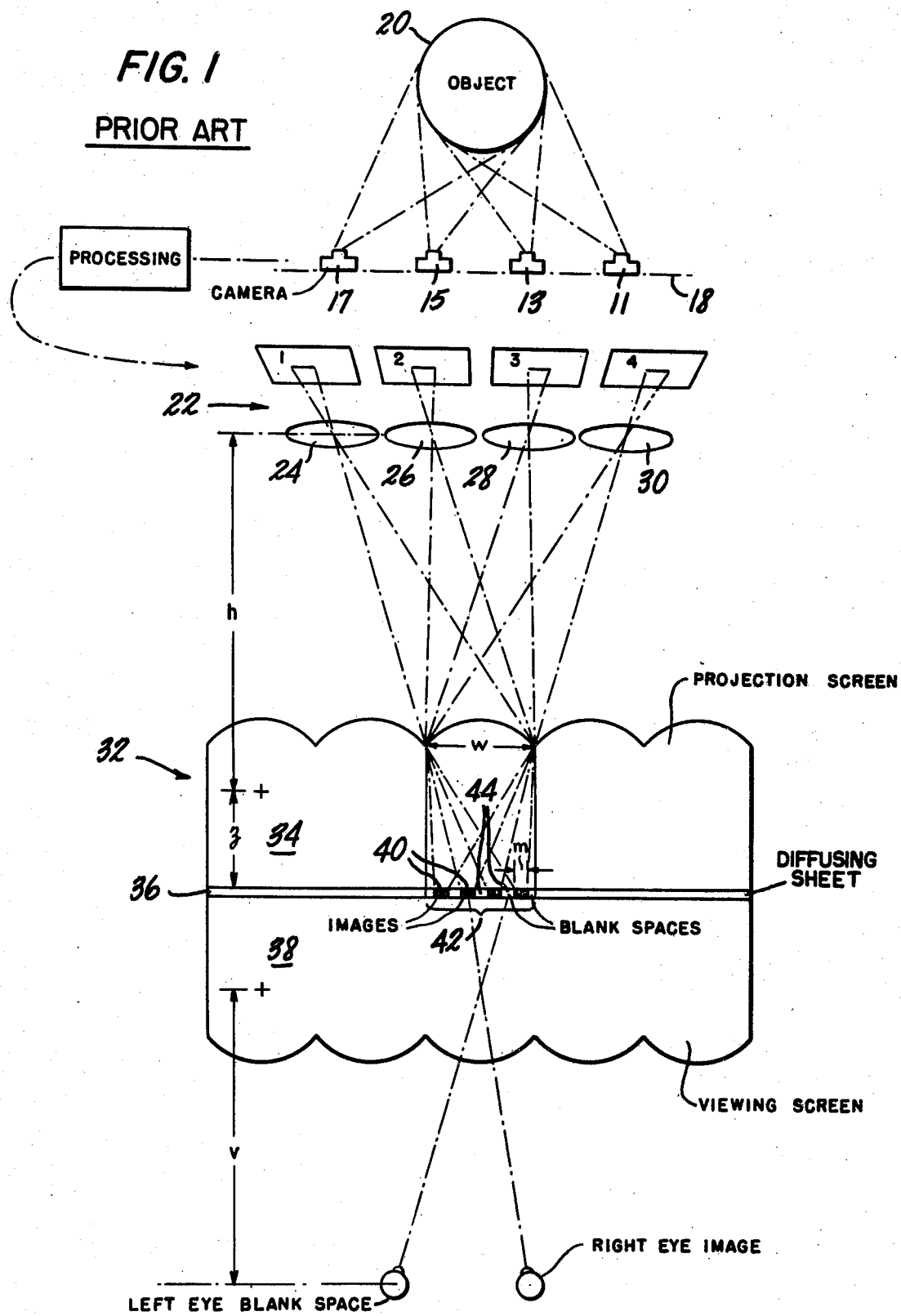
FIG. 1 is a diagrammatic view of the overall indirect process for production of stereoscopic pictures, as practiced in the prior art.

The prior art background of the present invention as well as the preferred embodiments thereof will now be described with reference to FIGS. 1-8 of the drawings.

As alluded to above, the indirect process as practiced in the prior art includes basically two distinct steps: a photographing or taking step and a projecting or composing step. These steps are illustrated diagrammatically in FIG. 1 in the context of the overall indirect process. In the taking step, a series of two-dimensional views of an object field are taken from a corresponding number of photographic vantage points aligned transversely of the object field. The different photographic vantage points may be established by arranging a number of equidistantly spaced cameras of substantially identical optical characteristics along a path perpendicular to the optical axes of the cameras. Alternatively, a single camera may be moved from vantage point to vantage point relative to the object field (or the object field moved relative to a stationary camera), or a single camera having a number of objectives may be used. An exemplary camera arrangement, therefore, might take the form illustrated in FIG. 1, with four individual cameras 11, 13, 15 and 17 positioned along a straight path 18 and centered relative to the object 20 to be photographed. upon exposure, the cameras 11–17 produce on the corresponding film frames 1, 2, 3 and 4, respectively, latent images of the object 20. The frames 1–4 are then processed (developed, trimmed, etc.) for use in the subsequent composing or projecting step.

The processed frames (negatives or positives) 1–4, bearing developed images of the object 20, are placed in proper order in a projector 22 having a number of projection lenses 24, 26, 28 and 30 which are independently adjustable for control of magnification and for alignment of corresponding images of a selected object field element from the several frames. The particular image portions selected for registration during projection will determine the object field element that will appear to lie in the plane of the stereoscopic picture.

If the projector 22 is utilized to compensate photographic prints of a stereoscopic picture, the various images are projected onto a lenticular screen comprising a so-called "lenticular film"; i.e., a layer of transparent material having a series of parallel lenticules embossed on one side and a photosensitive emulsion disposed on the opposite planar surface. The photosensitive emulsion may be coated directly onto the planar surface of the transparent material or it may form a part of a separate film placed adjacent this surface. The lenticular film, so made, is arranged in the composing apparatus with the lenticules facing the projection lenses. After exposure, the emulsion is suitably processed to provide a stereoscopic picture which, upon viewing, affords to the observer an overall view of the object field in relief.

If the projector is employed, as illustrated in FIG. 1, to project positive images in such a way that a stereoscopic picture may be directly viewed by an observer, the lenticular screen 32 is formed as a laminate comprising, in successive order: (1) a projection screen 34 of transparent material having a first series of lenticules facing toward the projection lenses 24–30; (2) a light diffusing sheet or layer 36; and (3) a viewing screen 38 made of transparent material having a second series of lenticules facing away from the projection lenses 24–30. The lenticules of the viewing screen 38 normally have the same dimensions as, and are arranged in registry with, the lenticules of the projection screen 34. Where the viewing distance differs significantly from the projection distance, it may be desirable to use a viewing screen of slightly different lenticule dimensions than those of the projection screen.

Whether the projection apparatus 22 described above is employed as a composer to produce photographic prints or is used to project stereoscopic pictures for direct viewing, it is desirable that the projection distance h from the projection lenses 24–30 to the lenticular projection screen 34 be approximately the same as the expected viewing distance v between the lenticular viewing screen 38 and the observer. In this way the eyes of the observer will be able to focus on the proper condensed images 40 for three-dimensional viewing.

In addition, whether the projection apparatus is employed as a composer to produce photographic prints or is used to project stereoscopic pictures for direct viewing, it is desired that the entire image surface be filled with image elements or portions which are contiguous but do not overlap, so that a continuous, uninterrupted view of the object field is presented to the observer. However, as shown in FIG. 1 on the diffusing sheet 36, these image elements are, in fact, well-focused and condensed by the projection lenses and by the lenticules facing these lenses. In the usual case, the image elements are in reality very narrow line ("lineiform") images of considerably less width than the optimum required to fill the image band beneath each lenticule. As is apparent from FIG. 1, the image bands 42 are completely filled when the number M of condensed images 40 is made substantially equal to w/m, where w is the lenticule width of the lenticular screen and m is the width of the condensed lineiform images which, in turn, is determined by m = Pz/h, where h is the projection distance, P is the aperture size or width of the projection lenses 24–30 and z is the focal length of the lenticule.

The projection of too few images onto the lenticular screen results in a situation such as that shown in FIG. 1. In this case, where M is less than w/m, the condensed images 40 will not be contiguous. Blank spaces 44 will be present between successive ones of the images 40 so that, when the stereoscopic picture is viewed, portions of the picture seem to disappear. Conversely, if the number M of condensed images is in excess of w/m, the condensed images will partially overlap, causing the image density of the stereoscopic picture to vary over the width of the picture, with consequent loss of image quality.

Thus, the optimum number M is condensed images in each image band beneath a lenticule is w/m for the highest picture quality. Since the lenticule width w of the lenticular screen is normally standardized and the width m of the individual images depends upon optical variables which are normally given, the only parameter that is readily varied is the number M of projected images. However, because the aperture size of the lenses is necessarily smaller than the outer diameter of the lenses, it is not possible to arrange M lenses side-by-side and space them close enough to avoid producing gaps between the condensed images formed by adjacent lenses.

Figure 2:
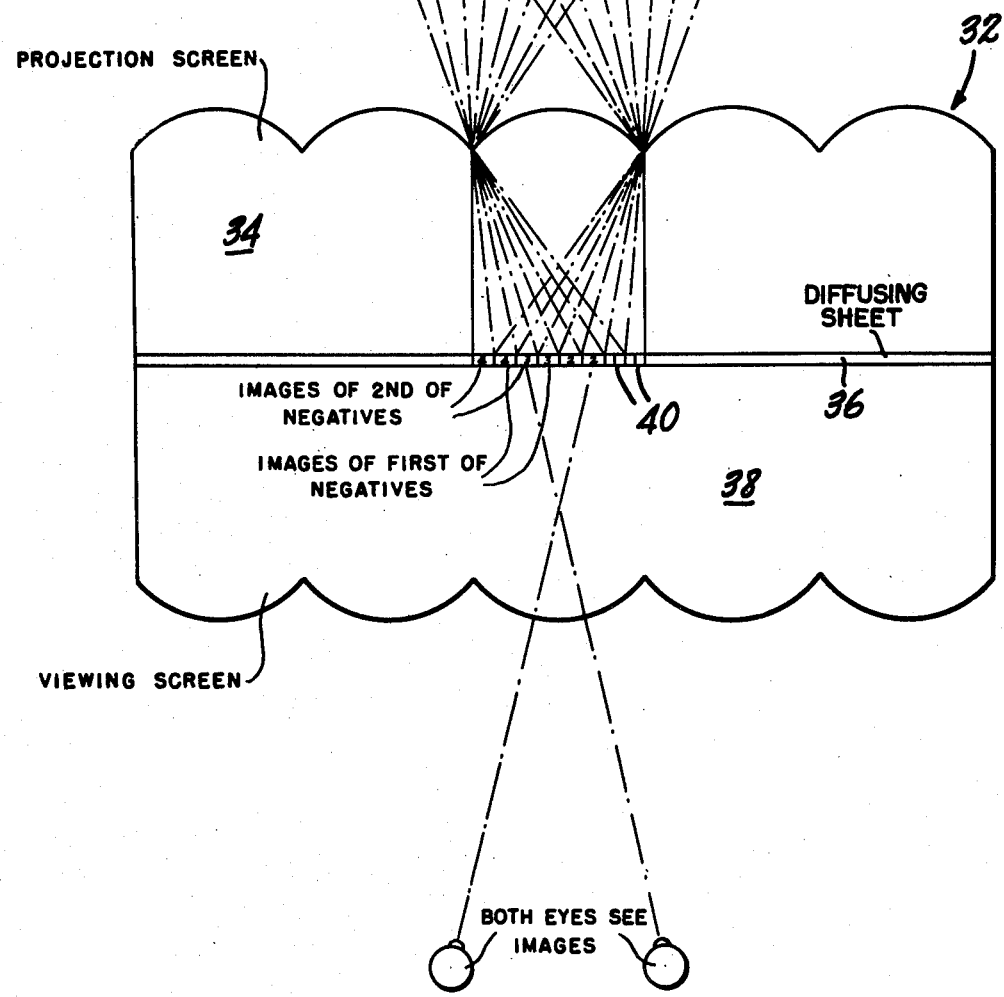
FIG. 2 is a diagrammatic view of projection apparatus, in accordance with the present invention, which eliminates blank spaces on a lenticular screen.
Figure 3:
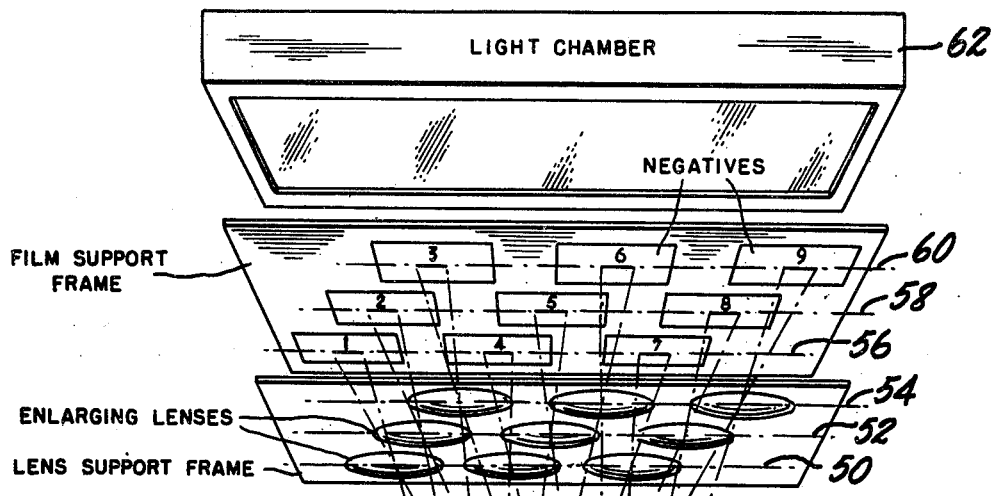
FIG. 3 is a diagrammatic view of composing apparatus, in accordance with the present invention, which eliminates blank spaces on a lenticular screen.

This difficulty encountered with M side-by-side lenses is overcome if the projection apparatus is modified in accordance with the present invention as illustrated in FIGS. 2 and 3. FIG. 2 shows a projection system of the type represented in FIG. 1 while FIG. 3 illustrates a composing system. In both systems the negative or positive frames as well as the projection lenses are distributed in the Y, as well as the X, axis direction. As referred to here, the X and Y axes lie in the plane of the frames to be exposed (which plane is parallel to the planes of the projection lenses and the lenticular screen) with the X axis perpendicular and the Y axis parallel to the individual lenticules of the lenticular screen.

As illustrated in FIG. 2, for example, the projection lenses are therefore arranged along a plurality of adjacent, parallel, straight lines 46 and 48 which extend in the X direction and are spaced apart in the Y direction by the minimum necessary distance (as described hereinafter). The first set of projection lenses, arranged along the line 46, receives light which is projected from above through a first set of frames 1–4 arranged in the direction of the X axis. The second set of projection lenses, arranged along the line 48, receives light that has been projected through a second set of frames 1–4 arranged parallel to the first set of frames but displaced sufficiently in the Y direction so that the frames are aligned with respective ones of the projection lenses in the second set.

As shown in the diffusing layer 36 of the lenticular screen 32 in FIG. 2, the condensed images of the second set of frames are interleaved with the condensed images of the first set of frames forming an uninterrupted, contiguous series of images. As illustrated diagrammatically in the lower portion of FIG. 2, such a series of images ensures that both eyes of the observer will always see an appropriate image.

In the example illustrated in FIG. 2, only four (N=4) different two-dimensional views of the object field are utilized. However, these four views are expanded into eight (M=8) condensed images 40 on the diffusing sheet 36 by providing two sets of identical positive frames and arranging these frames with respect to the projection lenses in the manner shown.

FIG. 3 illustrates how the frames may be arranged, in accordance with the present invention, if the number N of different two-dimensional views is exactly equal to the number M of condensed images to be formed in each image band on the lenticular screen. It will be understood by those skilled in the art that it is preferable to increase the number N of different views, rather than to duplicate views; however duplication is often necessary in practice because the number N of different views available is less than w/m or for economic reasons.

Since the apparatus shown in FIG. 3 is an enlarger — composer, the lenticular screen 64 is constituted by a sheet of transparent material 66 forming a single series of lenticules on one side and having a layer of photosensitive emulsion 68 disposed on the opposite side. The condensed images of portions of the nine different negatives are focused in adjacent, contiguous relationship beneath each lenticule on the photosensitive emulsion 68.

The enlarger — composer according to the present invention and illustrated in FIG. 3 lends itself readily to use in an automated system for development of stereoscopic pictures. An automated system is especially useful in cases where a single stereoscopic picture is to be duplicated a large number of times — for example, to produce picture postcards.

In such cases the composer apparatus according to the present invention has the advantage over the apparatus, abovementioned, for "scanning" the projected images to fill the image bands beneath each lenticule in that some time is saved during the composition of each picture.

Accordingly, in a particular preferred embodiment of the invention, the lenticular screen 64 is constituted by a flexible band or strip of material and apparatus is provided for moving successive lengths of this material into position opposite the enlarging lenses. As shown in FIG. 3, such apparatus may include a supply spool 70, a take-up spool 72, and a motor 74 arranged to repeatedly rotate the take-up spool a prescribed amount. In this way, the material forming the lenticular screen 64 may be advanced after composing and printing each stereoscopic picture.

Figure 4A:
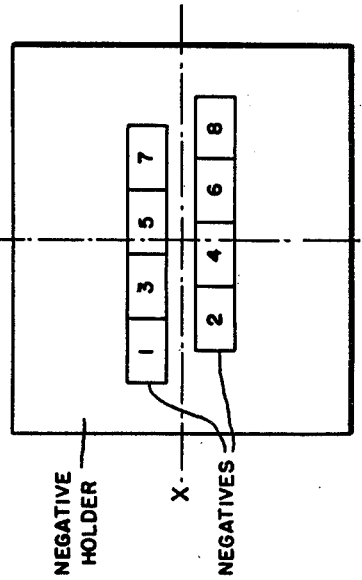
FIGS. 4(a) and 4(b) each show a film holder having plural pictures arranged, respectively, in two different formats.
Figure 4B:
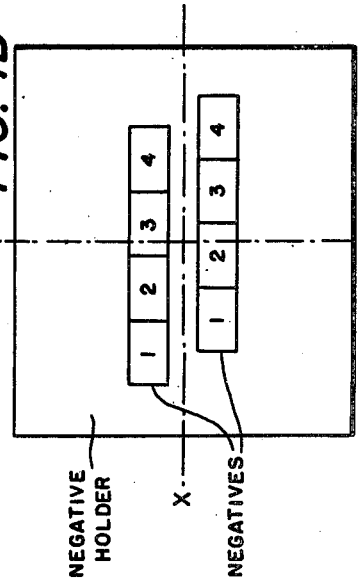
Figure 4C:
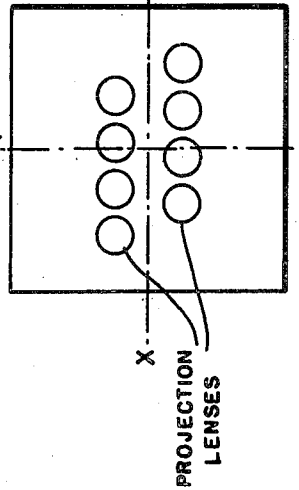
FIG. 4(c) is a plan view showing the arrangement of lenses in the apparatus according to the present invention to accommodate the lens holders of FIGS. 4(a) and 4(b).

FIGS. 4–6 illustrate, respectively, various embodiments of a lens arrangement for the apparatus according to the present invention and show, for each embodiment, the frame formats that may be used. FIGS. 4(a), 4(b) and 4(c) illustrate the frames and projection lenses arranged in two parallel rows spaced apart, in the Y direction, by a distance slightly greater than the diameter of the lenses (shown exaggerated in the drawings). In this case, four frames and four projection lenses are provided in each row (the "X" direction). FIG. 4(a) illustrates a format incorporating eight different views (N=8) whereas FIG. 4(b) illustrates a format in which four different views (N=4) are duplicated so that eight images (M=8) may be projected.

Figure 5A:
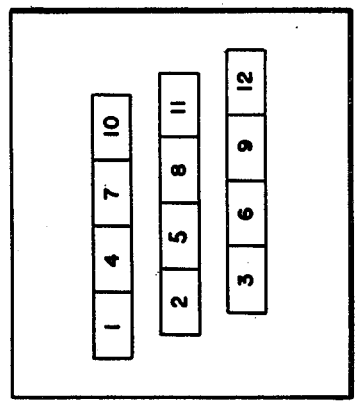
FIGS. 5(a) and 5(b) each show a film holder having plural pictures arranged, respectively, in two different formats.
Figure 5B:
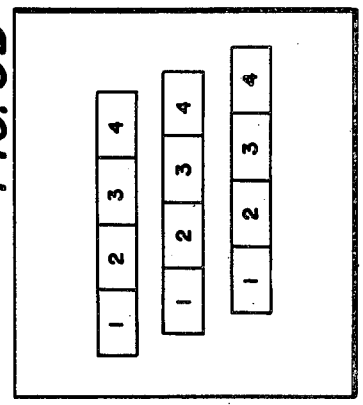
Figure 5C:
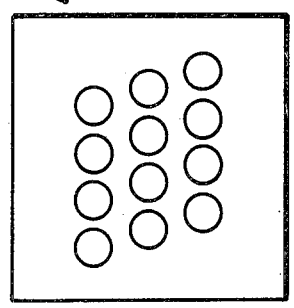
FIG. 5(c) is a plan view showing the arrangement of lenses in the apparatus according to the present invention to accommodate the lens holders of FIGS. 5(a) and 5(b).

FIGS. 5(a), 5(b) and 5(c) illustrate an embodiment in which frames and projection lenses are arranged in three rows, four to a row. In FIG. 5(a), the frames exhibit twelve (N=12) different two-dimensional views; in FIG. 5(b), a frame strip having four (N=4) different two-dimensional views is provided in triplicate.

Figure 6A:
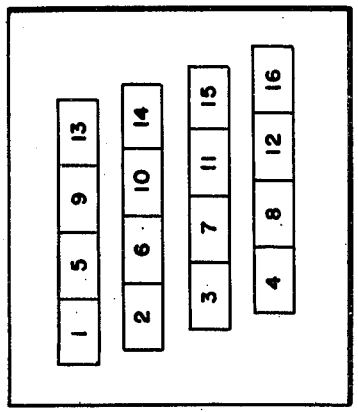
FIGS. 6(a) and 6(b) each show a film holder having plural pictures arranged, respectively, in two different formats.
Figure 6B:
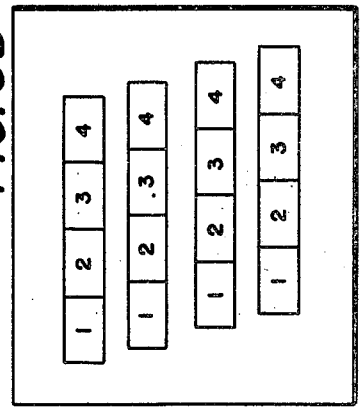
Figure 6C:
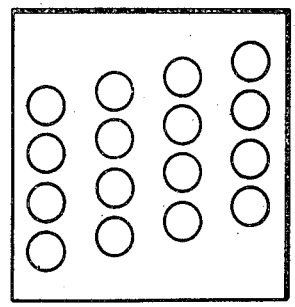
FIG. 6(c) is a plan view showing the arrangement of lenses in the apparatus according to the present invention to accommodate the lens holders of FIGS. 6(a) and 6(b).

FIGS. 6(a), 6(b) and 6(c) illustrate a third embodiment wherein the frames and projection lenses are arranged in four rows, four frames and lenses to a row. In FIG. 6(a) sixteen (N=16) different two-dimensional views are provided; in FIG. 6(b), four identical strips of frames, providing four (N=4) different two-dimensional views each, are arranged in staggered relationship in the four respective rows.

The frame formats and lens arrangements illustrated in FIGS. 4–6 are examples only and are not intended to suggest certain embodiments to the exclusion of others. As will be understood by those skilled in the art, the number of frames and lenses per row, and the number of rows, is limited only by the overall optical geometry defined by the variables h, w, etc. Further, although the same number of frames and lenses is shown in each row in FIGS. 2-6, it will be understood that different numbers may be used in the respective rows; see, for example, FIG. 8(a).

In order that the condensed lineiform images lie properly adjacent to each other in each image band beneath a lenticule of the lenticular screen, the frames should be staggered by equal distances and their corresponding projection lenses should also be staggered by equal distances. Thus, in the embodiment of FIG. 4, the frames and lenses in one row are displaced by equal amounts with respect to the frames and lenses, respectively, in the other row. In particular, as is illustrated, each frame or projection lens in one row is displaced in the X direction by an amount equal to one-half the distance between the centers of successive frames or lenses, respectively, in the other row. In FIG. 5, the frames and lenses of the successive rows are displaced in the X direction by an amount equal to one-third the distance between the centers of successive frames or lenses, respectively, in the previous row. In FIG. 6, the frames and lenses in successive rows are displaced in the X direction by an amount equal to one-fourth the distance between the centers of successive frames or lenses, respectively, in the previous row.

The distance, in the Y direction, between successive rows should be made as small as possible commensurate with the outer dimension of the lenses, the width of the two-dimensional views and whatever apparatus is necessary to conveniently hold the frames and the projection lenses in their proper respective positions. Too great a spacing in the Y direction introduces unwanted distortion due to projection through the outer protions of the projections lenses. In certain situations, the Y direction spacing may be less than the outer diameter of the lenses, as for example, where two rows of lenses are used and the lenses of one row interdigitate to some extent with the lenses of the other row. Generally, however, the spacing between rows will be approximately equal to the outer diameter of the lenses unless the width of the two-dimensional views requires a greater spacing.

Figure 7A:
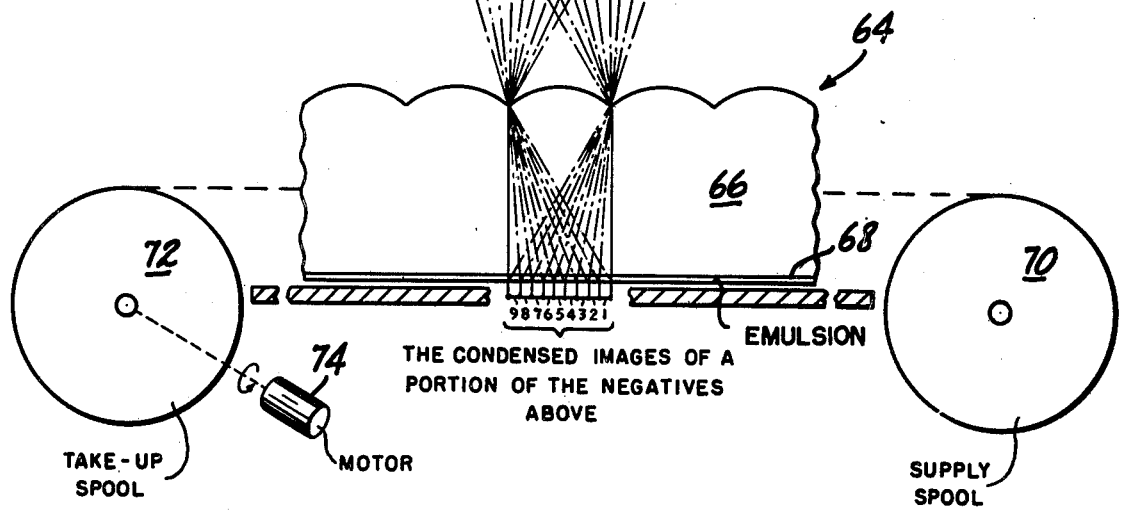
FIG. 7(a) is a representational diagram showing a strip of motion picture film having a plurality of pictures arranged in each frame in accordance with the present invention.
Figure 7A:
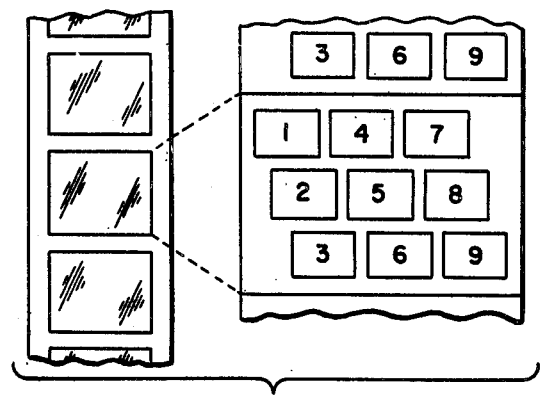
Figure 7B:
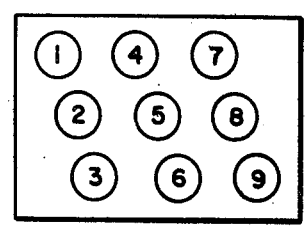
FIG. 7(b) illustrates an arrangement of lenses for a motion picture projector adapted to receive film of the type shown in FIG. 7(a).

The apparatus according to the present invention and described above for projecting stereoscopic pictures may be adapted and constructed to project motion pictures onto a suitable stereoscopic screen of the type illustrated in FIGS. 1 and 2. In this case, the plural frames are arranged in the appropriate format on successive sections of conventional motion picutre film as illustrated in FIG. 7(a). Due to the limited width of the film strip it may be desirable to reduce the number of frames in each row to two or three and appropriately increase the number of rows so that the total number of frames, and consequently the number of projected images M, in each section of film will equal w/m. FIG. 7(a) illustrates an embodiment in which frames bearing nine different two-dimensional views are arranged in three rows, three frames to a row (M=9). FIG. 7 (b) illustrates a projection lens arrangement appropriate for this film format.

Figure 8A:
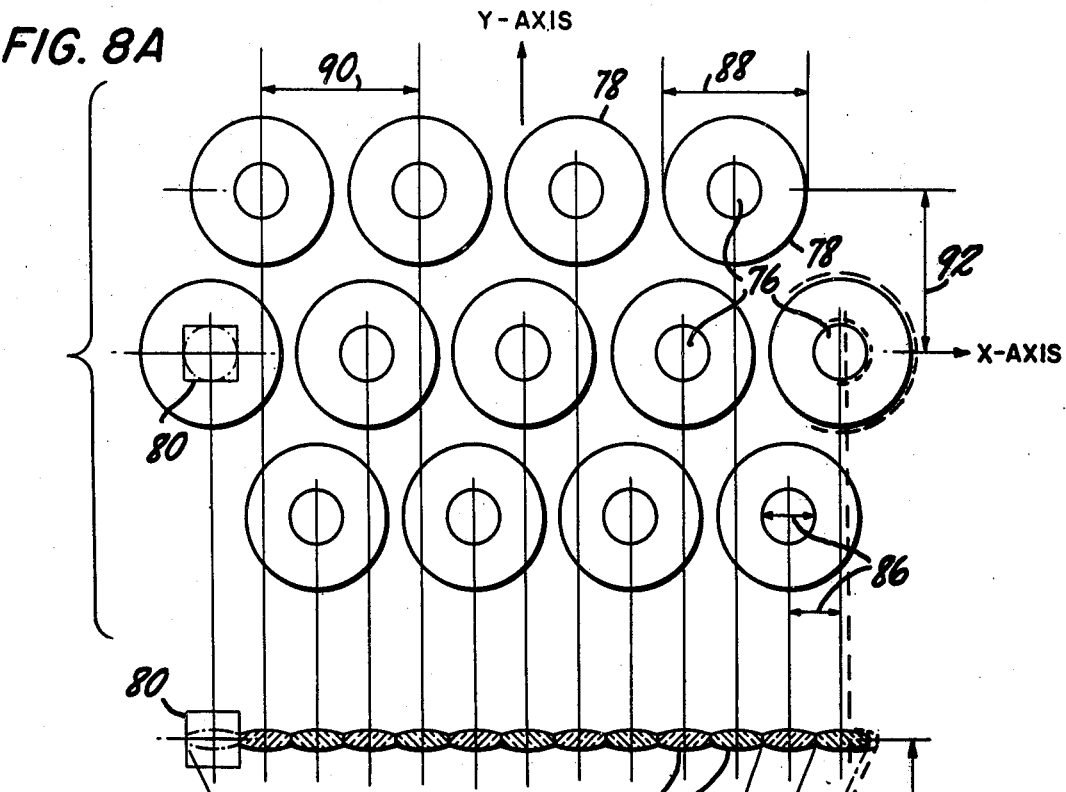
FIG. 8(a) and 8(b) are top and front diagrammatic views, respectively, of a portion of projection apparatus, in accordance with the present invention, showing an exemplary arrangement of the projection lenses and their apertures.
Figure 8B:
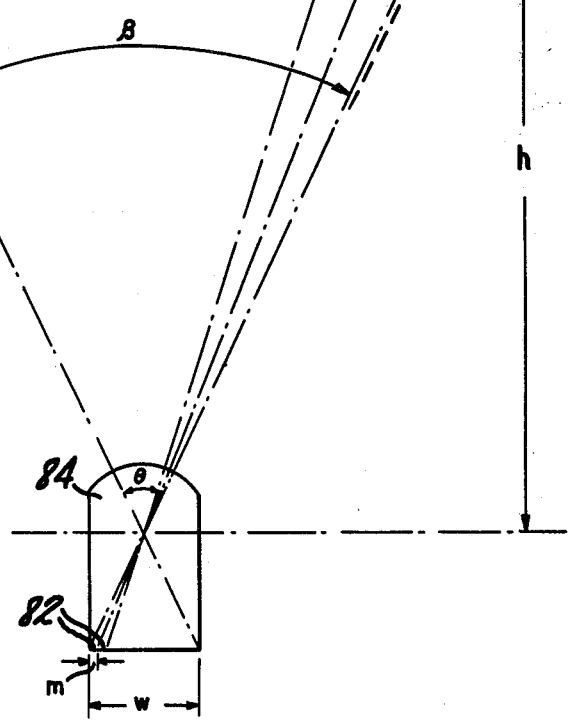

FIGS. 8(a) and 8(b) illustrate the relationship of the projection lenses and their apertures in the projection and composing system according to the present invention. Although the apertures 76 of the lenses 78 are illustrated as being round, square apertures, such as those indicated by the reference numeral 80, are preferred since they improve the evenness of density of the integrated composite image.

FIGS. 8(a) and 8(b) show how the arrangement of lenses according to the present invention facilitates the projection of immediately adjacent condensed lineiform images 82 beneath each lenticule 84. To accomplish this, it is necessary that rows of lenses 78 be offset relative to one another in the X direction such that the apertures 76, thereof, when viewed in the Y direction, are arranged successively side-by-side or edge-to-edge in contiguous fashion in the direction of the X axis. This condition is illustrated in the upper part of FIG. 8(a).

According to the present invention the lenses 78 are arranged in spaced-apart rows which extend in a direction (X axis) perpendicular to the longitudinal direction of the lenticules 84 of the lenticular screen. As previously noted, it is not necessary that the same number of lenses be arranged in each row.

As is illustrated in FIG. 8(a), the centers of the projection lenses 78 are separated in the direction of the X axis by a distance 90 which is determined by the length of the negatives, the focal length of the projection lenses and the projection length h. The centers of the lenses 78 are separated in the direction of the Y axis by a distance which, as previously mentioned, is preferably as small as the diameter of the lenses or the width of the negatives will permit.

Although the apertures 76 of the lenses 78 are depicted in FIGS. 8(a) and 8(b) as being all of the same size, the apertures 76 need not all be of identical size. For example, the apertures of one or more of the endmost lenses 76 may be smaller or larger than the apertures of the central lenses in order to match the projecting angle $\beta$ of the lenses to the acceptance angle $\theta$ of the lenticules 84 of the lenticular screen.

It will be understood that the present invention is susceptible to various modifications, changes and adaptions which fall within its spirit and scope. Accordingly, it is intended that the present invention be limited only by the following claims and their equivalents.

We claim:

1. An apparatus for composing a stereoscopic picture of the type comprising (1) a lenticular screen having cylindrical lenticules and (2) an image layer underlying said lenticules and containing a lineiform image band aligned with each lenticule, each band comprising a plurality of condensed images made from a corresponding plurality of two-dimensional photographic recordings taken from a number of spaced vantage points relative to an object field, said apparatus comprising a light source, a plurality M of projecting lenses, and means for supporting a corresponding plurality M of two-dimensional photographic recordings of an object field, each of which recordings contain substantially the entire object field and a plurality $N \leqq M$ of which were taken from different vantage points relative to the object field, in optical relation to said M projecting lenses such that the projected image of a selected common object field element on each recording is in substantial registry with a reference point; wherein the improvement comprises:

means for supporting said plurality M of projecting lenses in a plurality of first rows which are spaced apart in the direction transverse to the lengthwise extent of the first rows and which are offset relative to one another in the direction of the lengthwise extent of the first rows such that the apertures of said M lenses, when viewed in said transverse direction, are arranged substantially in edge-to-edge contiguous relation; and means for supporting said corresponding plurality M of photographic recordings in a corresponding plurality of second rows, which are aligned with and substantially parallel to respective ones of said first rows such that each photographic recording is aligned with a corresponding one of said projecting lenses and such that said common element on each photographic recording is projected in substantial registry with said reference point;

whereby said M projected two-dimensional recordings may form M condensed images at the rear surface of each lenticule of a cylindrical-lenticule lenticular screen, when said screen is positioned substantially at the place of said reference point with the lenticules thereof aligned lengthwise in said transverse direction, which are substantially contiguous and non-overlapping.

* * * * *

UNITED STATES PATENT OFFICE
CERTIFICATE OF CORRECTION

Patent No. 4,132,468              Dated January 2, 1979

Inventor(s) Allen K.W. Lo, et al

It is certified that error appears in the above-identified patent and that said Letters Patent are hereby corrected as shown below:

The portion of the term of this patent subsequent to July 18, 1995, has been disclaimed.

Signed and Sealed this

Thirteenth Day of March 1979

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,132,468　　　　　　　　　Dated January 2, 1979

Inventor(s) Allen K. W. Lo and Jerry C. Nims

It is certified that error appears in the above-identified patent and that said Letters Patent are hereby corrected as shown below:

Col. 2, line 8, "to" should read --in--;
Col. 3, last line, "upon" should be --Upon--;
Col. 4, line 15, "compensate" should read --compose--.

Signed and Sealed this

First Day of May 1979

[SEAL]

Attest:

RUTH C. MASON
Attesting Officer

DONALD W. BANNER
Commissioner of Patents and Trademarks